FRED H. MCELYA
ROBERT A. CUNNINGHAM
INVENTOR.

BY *Roy H. Smith, Jr.*
ATTORNEY

FRED H. MC ELYA
ROBERT A. CUNNINGHAM
INVENTOR.

BY Roy H. Smith, Jr.
ATTORNEY

FRED H. MC ELYA
ROBERT A. CUNNINGHAM
INVENTOR.

FRED H. MC ELYA
ROBERT A. CUNNINGHAM
*INVENTOR.*

BY *Roy H. Smith, Jr.*
ATTORNEY

FRED H. MC ELYA
ROBERT A. CUNNINGHAM
*INVENTOR.*

United States Patent Office 3,442,342
Patented May 6, 1969

3,442,342
SPECIALLY SHAPED INSERTS FOR COMPACT ROCK BITS, AND ROLLING CUTTERS AND ROCK BITS USING SUCH INSERTS
Fred H. McElya, Pearland, and Robert A. Cunningham, Bellaire, Tex., assignors to Hughes Tool Company, Houston, Tex., a corporation of Delaware
Filed July 6, 1967, Ser. No. 662,232
Int. Cl. E21b 9/08; E21c 13/02
U.S. Cl. 175—374
18 Claims

ABSTRACT OF THE DISCLOSURE

The original inserts of cemented tungsten carbide had hemispherical cutting tips, and rock bits using such inserts were used to drill the hardest abrasive formations, such as taconite, bromide and chert. This shape is not particularly effective for the drilling of abrasive formations of medium hardness, e.g., hard shales, dolomite and some limestones, and the inventors herein have developed inserts with more of a chisel or wedge shape to cut such rock. At the same time, they avoid the pitfalls of the "rooftop" style of cutting tip, one in which there are two flanks with flat surfaces converging to a flat crest.

Figure 1:
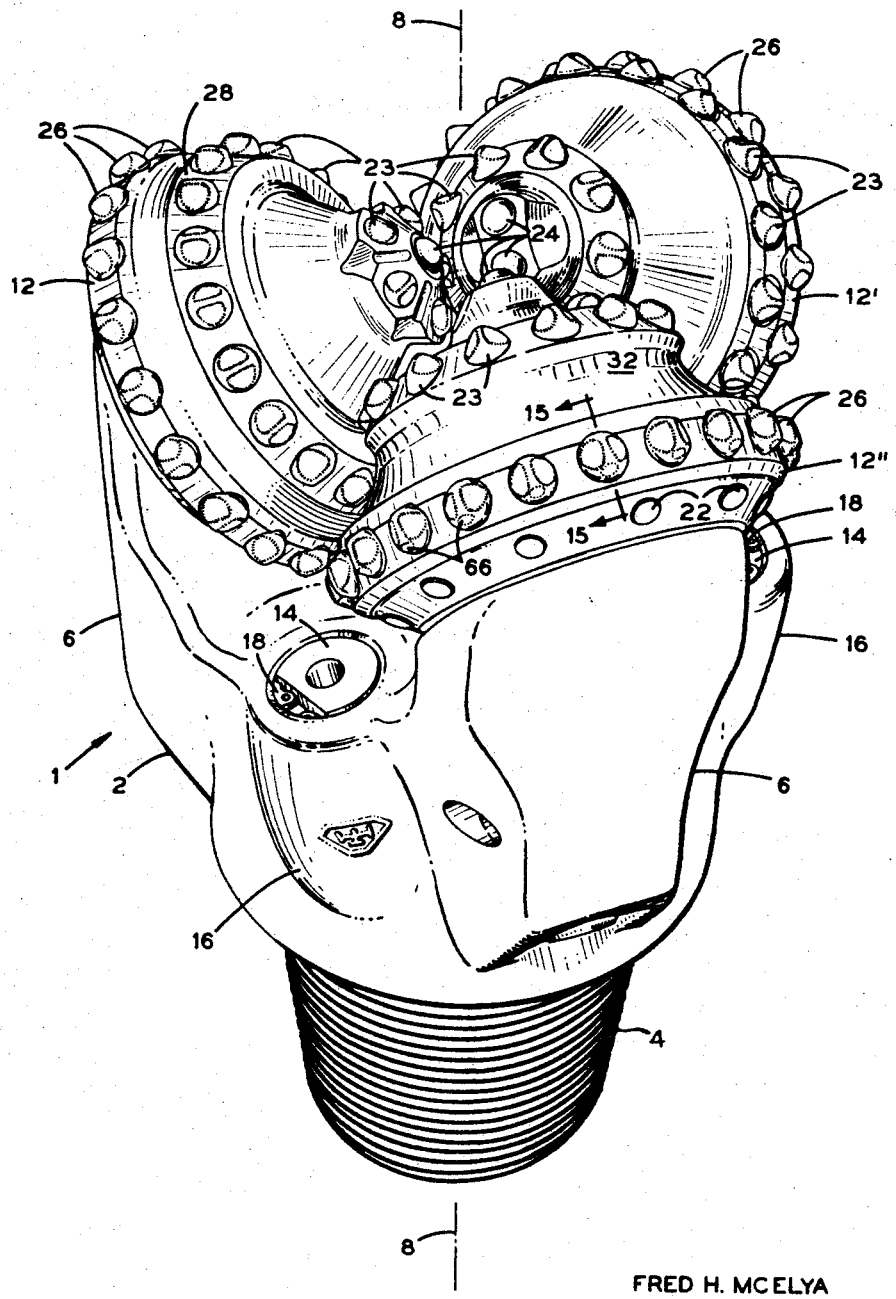

Two basic shapes of cutting tips are disclosed: (1) a modified chisel with convex flanks converging to a crest which is convex along its elongated length and its uniform narrow width, the flanks being normal to a common plane passing through the axis of the insert so that their projected intersection is a curve normal to such axis; and (2) a wedge shape in which the flanks are twisted or canted away from each other so that there is no single plane through the insert axis which is normal to both flanks and the projected intersection is not normal to the axis, the result being that the crest formed normal to the axis increases in width from one end to the other.

In all forms rounded intersections are provided to avoid the sharp corners and sharp edges which cause high stress concentrations. The inventors' theory is that treir rounding and their convex surfaces distribute the operating load over the cutting edge of the insert and direct such load to the center of the insert, thus avoiding the high stresses at the edges which they believe to be responsible for the chipping and breaking of rooftop inserts.

The present invention lies in the field of rolling cutter rock bits, and in particular that type of rock bit having for its cutting structure a multiplicity of small inserts of such wear resistant material as tungsten carbide secured in sockets in the surfaces of the rolling cutters. Such elements of cutting structure have come to be called interchangeably either "inserts" or "compacts," the former because of the fact that they are inserted in sockets in the cutters, and the latter because they are formed by pressing or compacting a mass of grains of the wear resistant material into the desired shape (together with grains of a binder such as cobalt, iron or nickel, and typically with a sintering step concomitant with or following the pressing step). Similarly, the rock bits with such cutting structure have generally come to be known as "compact bits." The inserts are generally made with a rather squat cylindrical base which seats in the cutter socket and has a blunt cutting tip which protrudes from the cutter surface.

Heretofore the only appropriate use of compact bits has been in those rock formations which are both highly abrasive and have very high compressive strengths, e.g., taconite, chert, graywacke, basalt, bromide and quartzite The compact bits have been eminently successful in drilling such formations, as a single one of them will drill a footage which required as many as ten of the best prior art milled cutter bits (rolling cutter bits with chisel-like integral steel teeth).

To be thus useful the inserts of the prior art bits were made with quite blunt cutting tips, e.g., the hemi-spherical or ovoid cutting tips disclosed in the U.S. patent issued in 1954 to Erwin A. Morlan, Henry B. Woods and Floyd L. Scott, No. 2,687,875. Such unusually shaped cutting tips worked well in the hard, abrasive formations mentioned despite their then unorthodox contours, apparently because those formations failed more by the crushing effect on them of the inserts than by the scrapping and gouging type of action which characterizes chisel-shaped steel teeth.

Since the introduction of such blunt tipped compact bits many attempts have been made to modify the cutting shape to a chisel or wedge so that bits thus modified could be used in drilling abrasive formations which are not as high in compressive strength, e.g., hard shales, dolomite, hard limestone, and granite.

It was recognized at the same time that the composition of the inserts was of some importance, as all compacts are brittle but become less brittle as the relative proportion of binder is increased. It has been discovered in developing the blunt-tipped compacts patented in 1954 that chisel shaped compacts break much more easily than those with blunt tips, but later workers thought that such breakage could be reduced or eliminated by increasing the percentage of binder in the composition of the wear resistant material and making their inserts in what has been dubbed a "rooftop" shape, i.e., with a pair of flat flank surfaces converging to a straight crest. The attempts to implement this thinking were not overly successful, as the compact bits with rooftop compacts of higher binder content generally experienced so much compact breakage that they were considered to be commercially unfeasible.

Accordingly, the primary object of the present invention is to provide inserts of wear resistant material which may be used as cutting structure elements in rock bits and other earth penetration tools to cut abrasive, medium hardness formations without undue breakage, such inserts having cutting tips in the general form of a chisel or wedge, i.e., with a pair of flanks which generally converge toward a crest. A kindred object is to provide rolling cutters utilizing such types of inserts as their cutting structure.

Another way of expressing an object of the invention is by saying that such an object is to provide a compact bit, and cutters and inserts therefor, capable of drilling efficiently those formations previously drilled by rock bits of the Hughes Tool Company in their series ranging from the "OWC" to the "W7R," as illustrated in their Catalogue 23 on pages 36 through 43.

The present invention embodies a conceptual departure from the prior art thinking in that the present inventors reasoned and verified by actual field experiments that at least the inner row inserts which are generally shaped like chisels on their cutting tips must be further shaped or contoured to eliminate sharp corners and edges and also surfaces which are completely flat. Such inserts differed considerably from those tried unsuccessfully by prior workers, primarily in that the prior workers attempted to copy into their inserts the chisel shapes of steel cutting teeth, including their relatively sharp edegs and corners, and also their flat flank surfaces. The present inventors substituted rounded edges, rounded corners and curved flank surfaces, and in so doing they reduced compack breakage to such a great extent that compact bits using the inserts shaped according to their invention matured into bits which are superior in performance to the best milled cutter bits previously used to drill the same abrasive, medium hardness formations. In addition, the present invention includes a heel insert cutting tip in which the flanks and crest may be either curved or flat, and differs from the inner row insert shape in another respect.

Whereas the flanks of the inner row compacts are approximately normal to a common plane and if projected would intersect in a line normal to the axis of the insert, the flanks of the heel row inserts are twisted or canted away from each other so that they are not normal to a common plane and the intersection of their projections would not be perpendicular to the insert axis. This construction gives the heel inserts the general shape of a wedge, as the crest is wider between one pair of adjacent ends of the flanks than at the other, and this difference is exploited by mounting the heel insert in the cutter so that the larger end of the crest is disposed to cut the formation at the juncture of the bottom and sidewall of the hole. This larger end is also rounded and provided with a small gage flat in the process of sizing the bit to cut to an accurate predetermined diameter. The larger area makes it possible to provide the gage flat without having such flat intersect either of the flanks of the insert.

Figure 2:
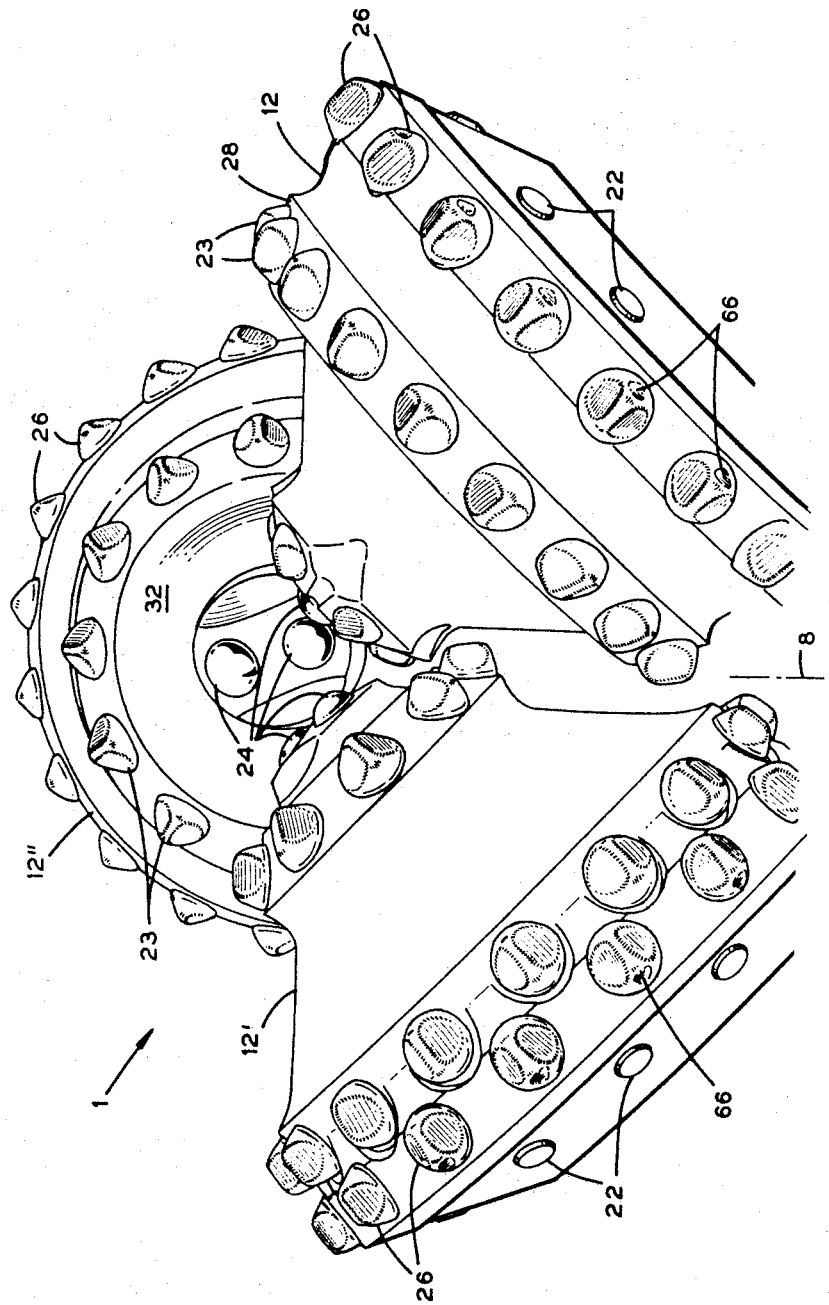
Figure 3:
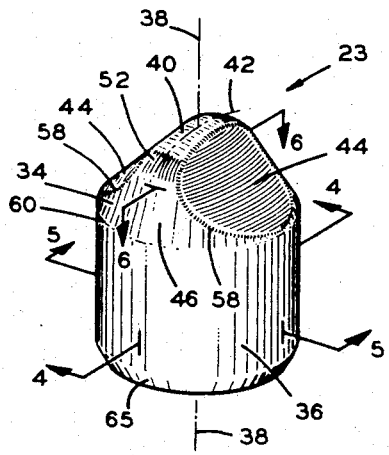
Figure 5:
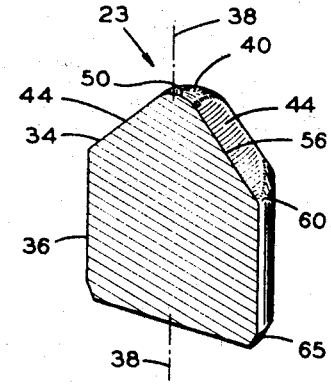
Figure 4:
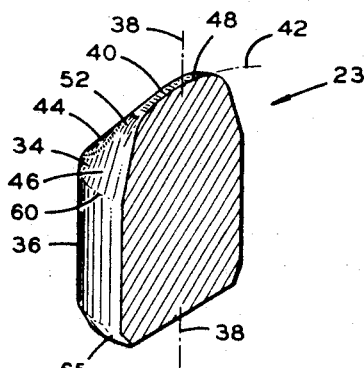
Figure 6:
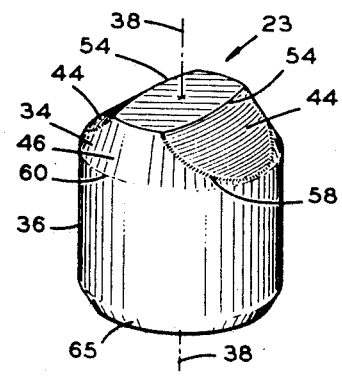
Figure 7A:
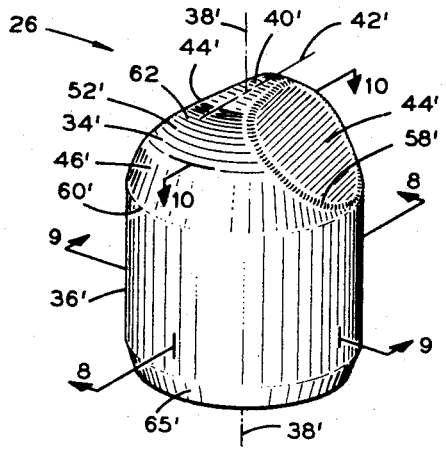
Figure 9:
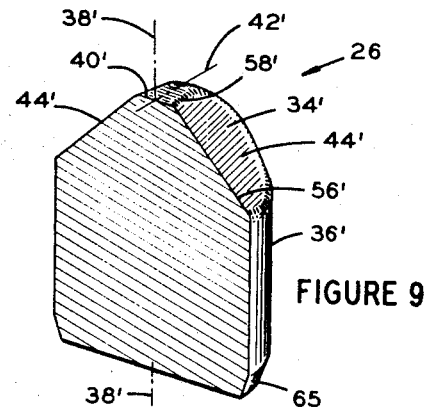
Figure 8:
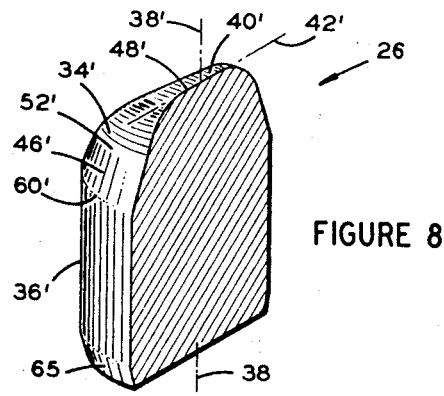
Figure 7:
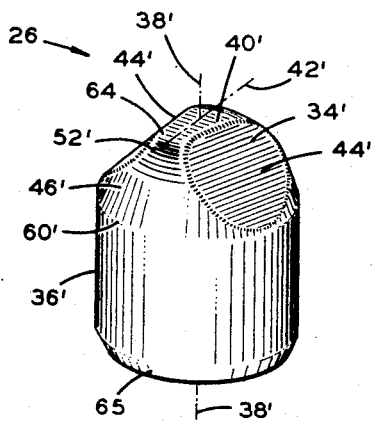
Figure 10:
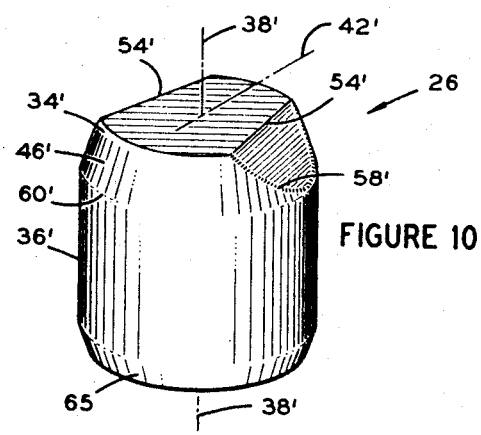
Figure 11:
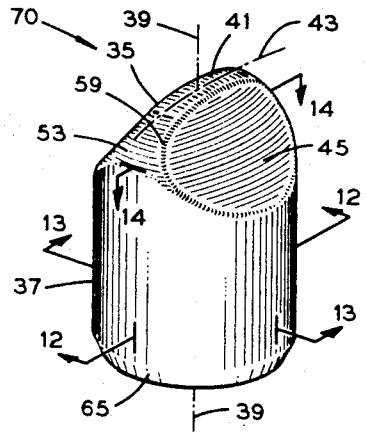
Figure 13:
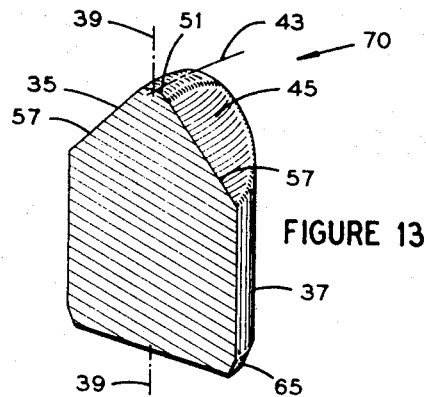
Figure 15:
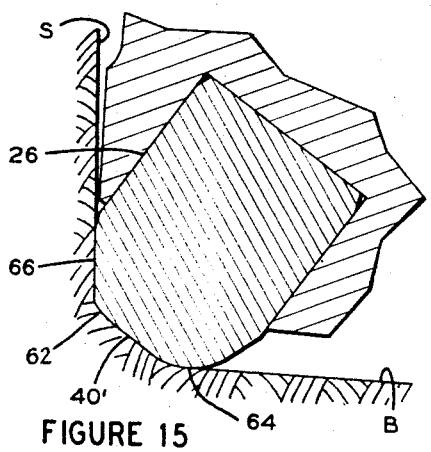
Figure 12:
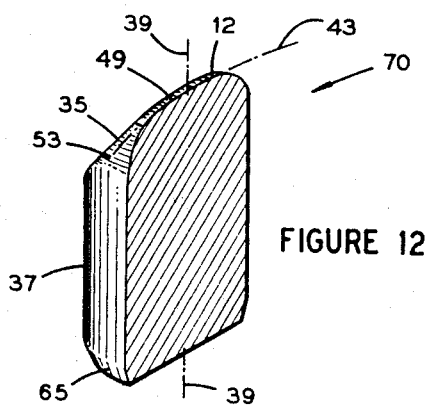
Figure 14:
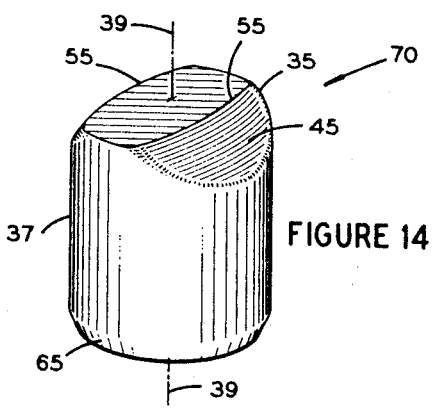
Figure 16:
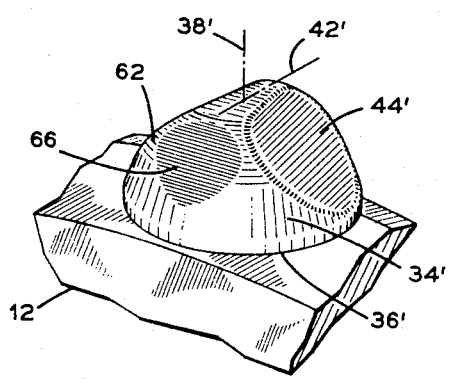

This and other features of the present invention may perhaps be better understood by reading the following detailed description in connection with the enclosed illustrative drawing, in which drawing:

FIGURE 1 is perspective view of a 3-cone rolling cutter rock bit embodying the invention, such bit having been introduced to the drilling industry by the Hughes Tool Company as an "X55R" rock bit, FIGURE 2 is a side elevation of the cutters of the same rock bit, FIGURE 3 is a somewhat enlarged perspective view of one type of insert used in the same bit, in the inner rows lying between the heels and apices of the cutter, FIGURE 4 is a perspective view of a half of the same insert as sectioned by an axial plane bisecting the insert through the median line of its cutting tip crest, as indicated by the lines and arrows 4–4 in FIGURE 3, FIGURE 5 is a similar perspective view of a half of the same insert, as bisected by an axial plane normal to the crest of the cutting tip, as indicated by the lines and arrows labeled 5–5 in FIGURE 3, FIGURE 6 is a similar perspective of a portion of the same insert, as cropped off by a plane normal to its longitudinal axis and passing through its cutting tip to remove the upper part thereof, as indicated by lines and arrows 6–6 in FIGURE 3, FIGURES 7, 7A and 8–10 are similar perspective views of another type insert used in the same bit, in the heel rows of the cutters, FIGURES 7 and 7A being views of a full insert taken 180 degrees apart and FIGURES 8–10 being views of portions of such insert as cut by the sectioning planes labelled 8–8, 9–9, and 10–10 in FIGURE 7A, FIGURES 11–14 are perspective views, similar to the group of figures denominated 3 through 6 and to the group 7 through 10, of another type of insert, having a shape used successfully in experimental work but not illustrated in the figures showing a full rock bit, FIGURE 11 being a view of a full insert and FIGURES 12–14 being views of portions of the same insert as sectioned by the planes indicated by the lines and arrows identified as 12–12, 13–13 and 14–14 in FIGURE 11, FIGURE 15 is an axial section through a portion of a rolling cutter employing the invention, as indicated by the lines and arrows marked 15—15 in FIGURE 1, this view showing the cutter fragment in its normal orientation with respect to the bottom and sidewall of a vertical borehole in a rock formation to portray the operation and disposition of a heel insert, and FIGURE 16 is a fragmentary perspective view of a heel insert mounted in a cutter and with the insert having a gage flat ground on its cutting tip.

To better illustrate its cutting structure, the views of the rock bit 1 shown in FIGURES 1 and 2 are such as to afford a clear view of the cutting structure. In FIGURE 1 the bit is shown in inverted position and the cutter end of the bit has been tilted somewhat forwardly to furnish the observer a more complete view of the rolling cutters. It will be understood that the following description refers to the normal position of the bit in the customarily vertical borehole, with the cutters at the bottom of the hole. Bit 1 comprises the usual body 2, upstanding tapered shank 4 threaded for connecting the bit to a drill string, three circumferentially equally spaced depending bit legs 6, a bearing pin (not shown) integral with each bit leg and extending downwardly and inwardly toward the central axis 8 of rotation of the bit, and a rolling cone cutter 12 rotatably mounted on each such bearing pin, the cutters differing slightly from each other in cutting structure arrangement and being distinguished in the drawing by labelling them 12, 12' and 12", corresponding to the usual trade designations of Cone No. 1, Cone No. 2 and Cone No. 3. The bit may be equipped with the now common jet nozzles 14 held in place in the openings in hollow bosses 16 by the illustrated snap ring 18, or drilling fluid passageways may be provided in the center of the bit body to connect the hollow interior of shank 4 to the space above the highest points of the trajectories of the three cutters.

Cutters 12, 12' and 12" are mounted on their bearing pins with any workable type bearing therebetween, either the well known anti-friction balls and rollers combined with a friction type nose bearing, an all friction or journal bearing, or various combinations thereof. They are normally equipped with gage inserts 22 of the type known in the prior art, and the circumferential rows of bottom cutting inserts on the three cutters are spaced from each other along the cutter axes to cut adjacent tracks in the bottom of the hole with the exceptions that the heel rows of inserts 26 of all three cones cut coincident tracks at the juncture of the bottom and sidewall of the hole, and the innermost row of inserts 24 on cutters 12' and 12" also cut the same track; cutter 12 has only a single insert 24 in its nose, and this insert overlaps the track cut by inserts 24 of the other two cutters. Also as now customary, the cutters are contoured with insert-mounting lands such as 28 spaced apart by grooves such as 32 to provide some intermeshing of the cutters, i.e., the inserts on a land like 28 rotate through a groove like 32 of an adjacent cone.

It will be understood that the description thus far is simply prefatory of the present invention and describes its setting. It may also be mentioned that the present invention does not involve the metallurgy of the bit body and its integral parts, nor the metallurgy of the bearings or the alloy steel cutters. Also, the inserts may be mounted in the cutters in any sound and convenient manner, the preferred technique being the usual interference fit in the sockets provided for them in the cutters. It will be noted that the nose inserts 24 have cutting tips with the hemispherical shape taught by the prior art.

The invention lies in the inner row and heel inserts themselves, particularly the shapes of their cutting tips, although the invention also comprehends the dispositions of the inserts over the cutters, i.e., one type being disposed in the heels and another type in the inner rows, etc. To illustrate the importance of these shapes, various types of inserts are shown in enlarged form in FIGURES 3, 7 and 11, together with portions of such inserts in other figures.

The insert 23 of FIGURES 3–6 is an inner row insert used between the nose inserts 24 and heel inserts 26 of bit 1. It comprises the cutting tip portion 34 and the integral base portion 36, the latter being typically cylindrical and both parts being centered about axis 38 of the base. It should be noted that base 36 is made in cylindrical form largely because it is the most practical. Sockets of square or hexagonal, etc., cross-section could be formed, but it is much more economical to drill circular holes, and similar considerations apply to the bases of inserts 23 and all other inserts described below. Inserts of rectilinear cross section have the advantage of preventing the rotation occasionally observed in cylindrical inserts, but this advantage is slight by comparision with the much larger cost involved.

The cutting tip 34 of insert 23 has its outermost extremity a curvilinear crest 40, and this crest has a median line 42 which divides the crest into two equal and symmetric halves. In addition, a plane through longitudinal axis 38 and the median line 42 of the crest divides the entire insert into two halves symmetric in such plane. Cutting tip 34 also has a pair of flanks 44 disposed at equal angles with respect to such plane of symmetry and axis 38, 45 degrees as illustrated or a 90 degree included angle between flanks 44, and thus such flanks 44 generally converge toward crest 40. The balance of the cutting tip is a conical surface 46 symmetric about axis 38 which in the illustrative embodiment of FIGURES 3-6 forms an included angle of 160 degrees with the outer surface of base 36.

The same figures also illustrate the outwardly convex rounded shapes of the various surfaces and intersections of the invention. Thus FIGURE 4 shows that crest 40 is round in the direction along its median line 42, while FIGURE 5 shows that it also rounded in the direction athwart its median line, as shown by the curves 48 and 50 of these figures. In this exemplary embodiment, curves 48 and 50 respectively have radii of 0.625 inch and 0.062 inch, with both centers lying on axis 38. The smaller curve 50 is tangent to flanks 44, while the large curve is connected to conical surface 46 by a round 52 of smaller radius, 0.125 inch as illustrated.

Flanks 44 of insert 23 are also rounded, being convex outwardly as best seen in FIGURE 6 by the curve 54 formed by cutting through tip 34 with a horizontal sectioning plane (i.e., a plane normal to longitudinal axis 38 when such axis is vertical). In the exemplary insert, which has a base diameter of 0.44 inch, an overall length of 0.562 inch and an axial length of cutting tip of 0.194 inch, the radius of curvature of the flanks 44 is 0.812 inch. It will be noted from FIGURE 5 that the flanks of this embodiment are not curved in the other direction, as shown by lines 56 defining the intersection of the flanks with a vertical axial plane, but they can be thus curved without ill effect, i.e., flanks 44 could, for instance, be portions of spherical surfaces.

In addition to the described curves and rounds, it may also be mentioned that the intersections 58 of flanks 44 with conical surface 46 are also preferably rounded, a radius of 0.062 being used in the embodiment portrayed in FIGURES 3-6. The intersection 60 of base 36 and conical surface 46 may be rounded or not rounded, but the included angle at this intersection is so large that rounding is generally unnecessary.

An important point about the convex flanks 44 and crest 40 of cutting tip 34 is the fact that the natural intersection of flanks 44, if they were projected above crest 40 to a sharp intersection, is a curved line parallel to the median line 42 and lying slightly above it. This fact permits crest 40 to be made convex along its median line with a uniform small width, thus presenting a relatively sharp cutting structure which preserves its sharpness as the flanks are gradually worn in the drilling process. If the flanks were flat surfaces, their natural intersection would be a straight line and a crest curved along its longer dimension in the manner of crest 40 could not be provided except in a non-uniform width, thin at the middle and flaring out to a larger dimension at each end. Such a crest is considered undesirable because if the center dimension were made large enough to avoid breakage the ends would be so wide that the tip would be dull at those locations, and on the other hand if the ends were thinned down to a sharp width the center part of the crest would be so fragile as to invite early breakage.

All of the above described curves and rounds (and those described below) should be incorporated in the compacts prior to sintering, either in the pressing mold or by grinding the pressed green compact before it is sintered. Grinding the compacts after sintering is slow, tedious and expensive, and unless performed carefully is likely to overheat the material. The inventors' experience indicates that any such postsintering grinding should be done with the insert dry, as the use of a coolant will cause heat checks in the ground insert.

It is the inventors' theory that their inserts as above described do not chip or break because their curved surfaces and rounded intersections distribute the bottom cutting load evenly and direct it to the center of the insert, whereas with flat surfaces and sharp intersections there are high concentrated loads which result in high unit stresses in and near the edges of the cutting tip, stresses which are relieved by chipping and breaking of the insert.

One of the heel inserts 26 of bit 1 is illustrated in somewhat enlarged form in FIGURES 7–10 and 7A, and it is also shown in the fragmentary FIGURE 15 in operative attitude in a borehole. It is generally similar to the inner row inserts 23 shown in FIGURES 3–6, and for this reason the similar and analogous surfaces and intersections have been designated with the same arabic characters except that the heel insert numbers have a prime (′) added to distinguish them. One of the major differences is that in going from the inner row inserts 23 to the heel inserts 26 the flanks 44′ are skewed away from each other (rotated in opposite directions, horizontally when longitudinal axis 38′ is vertical) so that their projected intersection is no longer a line parallel to the median line 42′ of crest 40′, and there is no longer a single plane through axis 38′ which is normal to both flanks 44′. In the exemplary insert of the drawing, the angle of rotation for each flank, which is also the angle between median line 42′ and the line 54′ lying on the flank surface and defining its intersection with a plane perpendicular to insert axis 38′, is 10 degrees.

The effect of this change, coupled with making crest 40′ generally orthogonal to axis 38′, is to give the cutting tip 34′ something of a wedge shape. The narrow width of the crest varies somewhat along its length, being smallest at its end where the flanks are closer and largest at its opposite end, where the flanks are most widely separated. There is also an increase in the area of surface portion 62 between one pair of flank ends at the wider end of crest 40′, and a decrease in the area of surface portion 64 at the sharper end of the crest, such surfaces 62 and 64 being portions of conical surface 46′ and rounded surface 52′. The larger such surface 62 is then disposed outwardly in close proximity to the sidewall S of the borehole, see FIGURE 15, while the smaller surface 64 is the closer to the bottom B of the hole.

After all inserts have been mounted in the cutters and the cutters have been assembled to the rest of the bit, the bit is sized to an accurate predetermined diameter. This is accomplished by a small amount of grinding on the surface 62 of each heel compact 26 to produce a small flat 66, as shown in FIGURES 15 and 16. The angle at which such flats are cut is such that as each compact 66 rotates through its lowermost position the flat 66 is parallel to the axis of the bit and is thus parallel to sidewall S. As it swings through such position it rubs against the sidewall to remove any formation material lying inside the bit diameter, thus keeping the hole dressed to gage. While flats 66 vary somewhat in size because of manufacturing tolerances, the heel inserts are designedly mounted to require some grinding to size the bit, for if no flats 66 were provided and the convex surfaces 62 were simply tangent to the sidewall of the hole, there would be nothing but point contact and the hole would quickly become under gage as the contact points wore away.

The wedge configuration thus provides in one insert a rounded or ovoid configuration to disintegrate the difficult-to-cut material at and immediately adjacent the sidewall of the hole, necessarily modified to provide a flat gage surface, and a sharper configuration to cut the bottom of the hole next to its intersection with the sidewall. At the same time, the provision of flat 66 on the larger convex surface 62 avoids any intersections of such flat with crest 40' and flanks 44', intersections considered undesirable because they would be sharp edges and would reduce the area of the flats.

In addition to twisting the flanks 44' away from each other in heel inserts 26, the flanks 44' are flat surfaces and crest 40' is flat in its center portion—for a length of 0.112 inch along median line 42' for the illustrated heel inserts of 0.44 inch diameter, overall length or height of 0.554 inch, and a cutting tip 34' length of 0.180 inch. These surfaces can be rounded in the same manner as the corresponding surfaces of the inner row inserts 23, in those instances where heel row inserts suffer more breakage than the inventors have heretofore experienced. The heel inserts as illustrated have had little breakage while inner row inserts made with flat flanks and crests did break excessively.

In other respects inserts 26 and 23 are similar, a round 58' being provided to eliminate the sharpness of the intersections between flanks 44' and conical surface 46', and also between flanks 44' and crest 40' and rounded surface 52' (0.062 inch radius as illustrated). In the preferred form illustrated, rounded surface 52' has a radius of 0.141 inch and is tangent to crest 40', the included angle between base 36' and conical surface 46' is 160 degrees, and flanks 44' meet crest 40' at the center of the latter so that the center dimension across the crest, normal to its median line 42', is 0.028 inch. The flanks 44' as seen in an axial plane through this normal form an included angle of about 90 degrees, as shown in FIGURE 9.

The inserts 70 shown in enlarged form in FIGURES 11–14 are also quite similar to the inserts 23 shown in FIGURES 3–6, and for this reason the parts of the FIGURES 11–14 inserts are distinguished by odd-numbered reference characters following in order the similar or analogous even-numbered reference characters of the FIGURES 3–6 inserts. The major difference between the two is that the FIGURES 11–14 inserts have no conical surface like surface 46 of the FIGURES 3–6 inserts, but rather base 37 extends upwardly to intersect cutting tip 35 in its flanks 45 and the rounded surface 53 which also intersects crest 41.

In other respects the two inserts 23 and 70 are very similar, crest 41 being rounded in two directions as shown by curve 49 of FIGURE 12 and curve 51 of FIGURE 13, and flanks 45 are convex outwardly in one direction as indicated by curve 55 of FIGURE 14 and line 57 of FIGURE 13. The intersection of flanks 4 with rounded surface 53 is rounded, as indicated at 59.

Exemplary dimensions of an insert like that illustrated in FIGURES 11–14 and successfully reduced to practice in field experiments are base diameter 0.44 inch, overall height 0.50 inch, height of cutting tip 35 of 0.194 inch between zenith of crest and nadir of flank periphery, a 90 degree included angle between flanks, a radius of 17/32 inch for the median line 43 of the crest and a radius of 13/16 inch for the curvature of outwardly convex flanks 45 (curves 55). The outwardly convex rounded surface 53 has a radius of 7/64 inch and crest 41 has a radius of 1/16 inch in the dimension transverse its median line 43, with which radius the crest is made tangent to flanks 45. The inserts are provided with a chamfer 65 at the inner (bottom) ends of their bases in all three of the described forms, such chamfer being at 15 degrees with the axis of the insert and extending over a height of 0.045 inch. This chamfer simply provides a means for starting the inserts into their sockets.

Two bits like those illustrated in FIGURES 1 and 2 and having the heel and inner rows of inserts as shown in FIGURES 3–10 and described above were made in 7⅞ inch size and having jet nozzles, main bearings with balls and rollers, friction nose bearing, and a sealed and pressure-compensated system as disclosed in U.S. Patents 3,075,781 and 3,007,751. These bits were tested in drilling an oilwell in Wonsits Valley Field of Uintah County, Utah, in a formation known locally as the Green River strata and generally describable as hard, sandy shale. The bits had the serial numbers EZ 328 and EZ 329, and the test was identified as PSR 1510. Both bits were run under a weight of 32,000 pounds at a rotary speed of 82 revolutions per minute at depths between 2858 feet and 4858 feet, and a drilling mud having a Marsh funnel viscosity of 33–35 seconds was circulated throughout the test.

Bit EZ 328 drilled 1052 feet of the hard, sandy shale in 57¼ hours, an average of 18.4 feet per hour, while bit EZ 329 drilled the next 948 feet in 52 hours, an average of 18.3 feet per hour. Neither bit was completely dulled when pulled, and aparently could have drilled more footage. The following bit in the same hole (and formation) was a milled tooth W7J bit, and drilled only 209 feet in 11½ hours at 50,000 pounds weight and 80 r.p.m. rotary speed, at the end of which run it had to be pulled because it was completely dulled.

On the basis of this test and with additional data on the average performance of milled cutter bits in offset wells, the two bits replaced 6 and 9 such milled cutter bits, and did so with comparable or better drilling rates. The savings to the drilling contractor are believed to be obvious, as he not only uses less bits and drills faster, but saves the tremendous cost of several round trips in changing bits. The savings per bit of the invention are measured in thousands of dollars rather than only hundreds.

Two 7⅞ inch diameter bits were made as described above except that the inner row inserts were like those shown in FIGURES 11–14 and the heel rows were like FIGURES 7–10 except that there were no conical surfaces 46,[1] the base extending upward to meet the flanks and rounded surface. These two bits were identified as numbers BT 276 and BT 277, and the tests as PSR 1389.

These two bits were also tested in drilling a well in the Wonsits Valley field of Uintah County, Utah, at a weight of 32,000 pounds and 85 r.p.m. and with a circulating mud of 37 seconds viscosity. The formation was sand, shale and lime. Bit BT 276 drilled 1017 feet in 52.8 hours, an average of 19.2 feet per hour, while bit BT 277 drilled 758 feet in 46.3 hours, an average of 16.4 feet per hour. These bits respectively replaced an estimated 5 and 8 of the best prior milled cutter bits, again with a large saving to the contractor and operator.

The four test bits of the invention above described may be compared with the aforementioned rooftop inserts by mentioning some of the test results in test PSR 1242 on 5 bits having rooftop type inner row compacts with flat flanks and crests and a 60 degree angle between flanks. Such 5 bits were like those in FIGURES 1 and 2 except for the inner row inserts, and the heel inserts were generally similar to the wedge type illustrated except for the fact that the crest of each insert was connected to its base by a single rounded surface which was approximately tangent to both the crest and the base. The flat flanks formed an included angle of 90 degrees.

The 5 bits were run in the same general area as the bits of the invention, in the same sandy shale type of formation. Inner row compact breakage was so extensive that the bits had to be pulled when the average run for the 5 bits was only 353 feet in 21.3 hours. A study of the bits disclosed that 36% of the compacts were broken, and 53% of the conical cutters had to be scrapped because of such breakage. By comparison, less than 2% of the inserts in the 4 test bits of the invention were broken, and none of the cones had to be scrapped because of insert breakage.

The described inserts used in the above tests were compacted from a coarse grained monotungsten carbide, and the binder grains were cobalt, 12% by weight of the total in the heel row (this mix being Carboloy Grade 120) and 20% in the inner rows. The standard ovoid-tipped inserts 24 used in the nose rows of all cones was Carboloy Grade 248, which uses cobalt binder constituting 11% by weight of the total composition.

In the above detailed description, the applicant-inventors have furnished what may appear to be unusually elaborate detail concerning the geometry and dimensions of their inserts. While the invention does involve such geometry, it is not limited to such details as the particular angles between surfaces or any specified radii of lines and surfaces, and such details are not furnished because they are critical. They are furnished rather by way of illustration, which is another way of saying that applicants are attempting thereby to satisfy their statutory obligation to furnish a written description of their invention, including the best means known to them of putting it into effect, "in such full, clear, concise and exact terms" that any person skilled in the art can utilize the description to make and use embodiments of the invention.

Broadly, the invention comprises wear resistant inserts having cutting tips shaped in the form of a chisel or wedge, by which is implied a pair of flanks converging to a crest. In the several forms of cutting tips all corners and edges which would otherwise be sharp are made rounded to avoid the high stress concentrations which are likely to be present at such sharp corners and intersections. In addition, each form may utilize flank surfaces which are outwardly convex in at least one direction, this type of flank having been found to be particularly advantageous in inner row chisel inserts, having both flanks normal to a common axial plane. Such inner row inserts also have a crest of a uniform narrow width, and this crest is curved both across such width and along its elongated dimension, the curvature being outwardly convex in each instance. In one modification of this inner row embodiment the outer surface of the base extends upwardly to the various surfaces of the cutting tip and is connected to them by rounding the sharp intersections that would otherwise be formed, while in another modification a small amount of draft is provided by an interconnecting conical surface. The modification having no such conical surface may have some advantage over the other, but it is extremely difficult to make a punch for pressing the conical surface insert that will not break in forming the inserts.

The heel row inserts differ from the inner row type in that the shape of the heel insert cutting tip is more of a wedge than a chisel. The flanks are canted away from each so that they are not perpendicular to a common axial plane, and the crest of the cutting tip varies in width from one end to the other, being of smallest width at the end where the adjacent pair of flanks approach each other most closely and of largest width at the end where the flanks are most widely spaced apart. At this wider end the cutting tip is provided with a relatively extensive rounded surface, and the insert is disposed in the rock bit cutter so that such surface engages the formation at the juncture of the sidewall and bottom of the hole. Prior to use but after assembly the bit is sized to a predetermined diameter by grinding a small flat on such rounded surface, and in operation this flat contacts the sidewall of the hole to maintain gage while the inner, sharper end of the cutting tip disintegrates the adjacent portion of the bottom.

One dimension which seems to have a direct bearing on the frequency of breakage of the inserts is the included angle between the flank surfaces. The examples above disclose only the use of a 90 degree included angle, but 70 degrees has also been used successfully, although with more breakage. Angles greater than 90 degrees can also be employed, but in thus going to larger angles the cutting shape will not be as sharp, and consequently a reduced cutting efficiency can be expected.

What is claimed is:

1. A shaped insert for a compact bit, said insert having a longitudinal axis, a base integrally joined to a cutting tip in the general form of a chisel, said cutting tip having a pair of converging flank surfaces which are outwardly convex in at least one direction, a crest extending between said flanks, and at least one rounded surface extending between said flanks, said crest and said base, said cutting tip being rounded at intersections between said crest, flanks and convex surfaces which would otherwise form sharp edges.

2. The insert of claim 1 in which said flank surfaces are convex in at least the direction defined by sectioning planes normal to the longitudinal axis of the insert and passing through such flank surfaces.

3. The insert of claim 1 in which said crest is rounded in at least one direction to be convex outwardly.

4. The insert of claim 3 in which said crest is rounded in two directions.

5. The insert of claim 1 in which said flanks are both normal to a common plane passing through said axis of the insert and are projectible to intersect in a line normal to said axis.

6. The insert of claim 1 in which the included angle between said flanks is of the order of 90 degrees.

7. The insert of claim 1 in which said flanks when projected intersect in a line diverging from a normal to said axis, and said rounded surface between said flanks is divided into two portions at opposite ends of said crest, one said rounded surface portion being larger than the other.

8. The insert of claim 7 in which each said rounded surface portion comprises a conical part joined to said base and a rounded part having a lower edge joined to said conical part and an upper edge joined to said crest.

9. The insert of claim 2 in which there is only one said rounded surface joining said flanks, said crest and said base.

10. The insert of claim 2 in which there are two said rounded surfaces, a lower conical surface joining the base and an upper rounded surface joining and extending between said conical surface and said crest.

11. A shaped wear resistant compact for rock bits comprising a base and a cutting tip integrally joined to said base, both said base and cutting tip being symmetric in a longitudinal axis, said cutting tips having a pair of converging flanks rounded in at least one direction to present outwardly convex surfaces and being disposed to intersect each other in a line approximately normal to said axis, a crest of uniform width extending between said flanks and having a median line intersecting and normal to said longitudinal axis, said crest being rounded in the direction along said median line and also in the direction normal to said median line, a conical surface joining said base and extending to said flanks, and a rounded surface joining said conical surface and extending to said crest and flanks, the intersections between said conical surface and flanks being rounded to eliminate sharp edges.

12. A shaped wear resistant compact for rock bits comprising a base and a cutting tip integrally joined to said base, both said base and cutting tip being symmetric in a longitudinal axis, said cutting tips having a pair of converging flanks rounded in at least one direction to present outwardly convex surfaces and being disposed to intersect each other in a line approximately normal to said axis, a crest extending between said flanks and having a center line intersecting and normal to said longitudinal axis, said crest being rounded in the direction along said center line and also in the direction normal to said center line, and a rounded surface joining said base, said flanks and said crest, the intersections between said rounded surface, flanks and crest being rounded.

13. A wear resistant insert for compact bits comprising a base and a cutting tip both symmetric in a longitudinal axis, said cutting tip being wedge shaped and having a crest decreasing in width from one end to the other and having a median line normal to said axis, a pair of converging flanks canted away from each other so that their projections intersect in a line diverging from a line parallel to said median line, and at least one rounded surface between said base, flanks and crest, said rounded surface comprising two portions of unequal areas disposed at the opposed ends of said crest, the intersections of said crest, rounded surface and flanks being rounded to avoid sharp corners and edges.

14. The insert of claim 13 in which said flanks and crest are flat.

15. A rolling cutter for a compact rock bit, said cutter having an outer surface with cutting structure thereon adapted to roll over the bottom of a hole in a rock formation to disintegrate said bottom, such cutting structure including between the ends of said outer surface inner rows of inserts of wear resistant material, at least some of said inner row inserts each having a base secured in the cutter and integrally joined to a protruding cutting tip in the general form of a chisel, said base and cutting tip having a common axis and said chisel shaped cutting tip having a pair of convex flanks converging to a convex crest which is substantially normal to said axis.

16. A rolling cutter for a compact rock bit, said cutter having an outer surface with cutting structure thereon adapted to roll over the bottom of a hole in a rock formation to disintegrate said bottom, such cutting structure including a row of heel inserts disposed at one end of said cutter surface to contact the outermost portion of said bottom, at least some of said heel inserts each having a base secured in the cutter and integrally joined to a protruding cutting tip in the general shape of a wedge, said base and cutter having a common axis and said wedge shaped cutting tip having a pair of flanks converging to a crest and having a projected intersection which is not normal to said axis.

17. A compact rock bit of the rolling cutter type which includes wear resistant inserts having protruding cutting tips in the general shape of a chisel, said shaped cutting tip having a pair of flanks which are outwardly convex in at least one direction and converge to an elongated crest which is curved outwardly along said elongated dimension.

18. A compact rock bit of the rolling cutter type which includes wear resistant inserts with cutting tips in the general shape of a wedge, said inserts having a longitudinal axis and said cutting tips each having a pair of flanks canted away from each other so that their projected intersection is not normal to said longitudinal axis of the insert, said cutting tip terminating in a crest extending between said flanks and being wider at one end than the other, and at least one rounded surface connecting said flanks and crest with the base of the inserts.

References Cited

UNITED STATES PATENTS

| | | | |
|---|---|---|---|
| 2,121,202 | 6/1938 | Killgore | 175—374 |
| 2,532,783 | 12/1950 | Phipps | 175—410 X |
| 2,687,875 | 8/1954 | Morlan | 175—374 |
| 2,689,109 | 9/1954 | Curtis | 175—410 |
| 2,774,570 | 12/1956 | Cunningham | 175—374 |
| 3,126,067 | 3/1964 | Schumacher | 175—374 |
| 3,344,870 | 10/1967 | Morris | 175—374 X |

NILE C. BYERS, JR., *Primary Examiner.*

U.S. Cl. X.R.

175—410